(12) United States Patent
Lewis

(10) Patent No.: US 6,907,163 B2
(45) Date of Patent: Jun. 14, 2005

(54) MULTI-PORT OPTICAL COUPLING SYSTEM

(75) Inventor: Warren Hale Lewis, Sunnyvale, CA (US)

(73) Assignee: JDS Uniphase Corporation, San Jose, CA (US)

(*) Notice: Subject to any disclaimer, the term of this patent is extended or adjusted under 35 U.S.C. 154(b) by 151 days.

(21) Appl. No.: 10/227,315

(22) Filed: Aug. 26, 2002

(65) Prior Publication Data

US 2003/0044115 A1 Mar. 6, 2003

Related U.S. Application Data

(60) Provisional application No. 60/314,626, filed on Aug. 27, 2001.

(51) Int. Cl.[7] .............................. G02B 6/32; G02B 6/26
(52) U.S. Cl. .......................................... 385/33; 385/39
(58) Field of Search ............................... 385/31, 33–35, 385/39, 50, 52, 73, 74, 88, 24, 48, 774

(56) References Cited

U.S. PATENT DOCUMENTS

| | | | | |
|---|---|---|---|---|
| 4,926,430 A | * | 5/1990 | Isono ........................... | 372/33 |
| 5,555,330 A | | 9/1996 | Pan et al. ..................... | 385/39 |
| 6,198,858 B1 | | 3/2001 | Pan et al. ..................... | 385/24 |
| 6,215,924 B1 | | 4/2001 | Hulse et al. .................. | 385/34 |
| 6,282,339 B1 | | 8/2001 | Zheng .......................... | 385/34 |
| 6,292,604 B1 | | 9/2001 | Cheng .......................... | 385/24 |
| 6,393,179 B1 | | 5/2002 | Cheng et al. ................. | 385/34 |
| 6,404,954 B1 | | 6/2002 | Zhu .............................. | 385/34 |
| 6,599,023 B2 | * | 7/2003 | Yu et al. ....................... | 385/73 |
| 6,702,476 B2 | * | 3/2004 | Bergmann et al. ............ | 385/55 |
| 2002/0006252 A1 | | 1/2002 | Im et al. ....................... | 385/48 |
| 2002/0071182 A1 | * | 6/2002 | Huang et al. ................. | 359/484 |
| 2003/0185519 A1 | * | 10/2003 | Ushinsky ...................... | 385/72 |

FOREIGN PATENT DOCUMENTS

JP 05113520 A * 5/1993 ............. G02B/6/32

* cited by examiner

*Primary Examiner*—Rodney Bovernick
*Assistant Examiner*—Sarah Song
(74) *Attorney, Agent, or Firm*—Allen, Dyer, Doppelt, Milbrath & Gilchrist, P.A.

(57) ABSTRACT

The invention provides an optical coupling system having a first collimator assembly having a first optical axis, a second collimator assembly having a second optical axis, an optical device, such as a tap coupler, an isolator or a WDM filter, disposed along an optical path between the first and the second collimator assembly, a first sleeve for containing the first collimator assembly, said first sleeve having an angled end face for forming a first angle, and a second sleeve for containing the second collimator assembly, said second sleeve having an end face for abutting the angled end face of the first sleeve such that the first optical axis of the first collimator assembly intersects with the second optical axis of the second collimator assembly at a coupling angle. The first sleeve and the second sleeve are relatively rotatable to each other for changing the coupling angle. Furthermore, the end face of the second sleeve is angled for forming a second angle.

20 Claims, 5 Drawing Sheets

MULTI-PORT OPTICAL COUPLING SYSTEM

CROSS-REFERENCE TO RELATED APPLICATIONS

This applications claims priority of U.S. Provisional Patent Application No. 60/314,626 filed on Aug. 27, 2001, entitled "4-Port Otto Hybrid" which is incorporated herein by reference for all purposes.

MICROFICHE APPENDIX

Not Applicable.

FIELD OF THE INVENTION

The present invention generally relates to the field of optical couplers and in particular to multi-port coupling devices.

BACKGROUND OF THE INVENTION

Combining multiple optical functions in a single hybrid device can provide systems designers several advantages. First, the insertion loss of a combined device will likely be lower than the summed loss of the equivalent combination of discrete components simply by eliminating the in/out coupling losses of multiple devices. Second, the size of a single hybrid device can generally designed to be smaller than the equivalent combination of discrete components, allowing designers more design flexibility in the size, complexity, and lay-out of system components. Third, the number of fibers in a system can be reduced, again allowing module size reductions as well as minimizing the problems of fiber routing in system components. Finally, inventory management is simplified by reducing the total parts count of an optical system.

The additional complexity of hybrid components, however, can present significant new manufacturing challenges, usually demanding that ever increasing requirements for optical performance, reliability, and cost be met simultaneously. While increasing device complexity (such as the number of internal parts and connecting joints) necessarily increases reliability risks over simpler parts, customers require the same reliability standards for hybrid as for traditional single function devices.

The use of glass tubes and thin sections of epoxy has been used to realize an epoxy-free optical path in passive fiber-optic components, while maintaining simplicity and low cost. This approach has been realized in the use of three or four glass tubes to hold lenses, filters, and isolator cores in devices having up to three optical fiber ports. The devices have been constructed using tubes with perpendicular end faces, and which have been laterally translated to accomplish alignment perpendicular to the beam path, as well as sliding longitudinally to accomplish the focus alignment.

The construction of devices with more than three ports has been difficult using this technique, because the incorporation of a sufficient number of degrees of freedom in the device has seemed to be incompatible with the translational alignment characteristic of the technique.

It is an object of this invention to provide a method of accomplishing angular adjustment between groups of optical elements.

It is a further object to incorporate the flexibility of the solder/collimator construction schemes with the simplicity, low cost, and reliability of the glass tube platform.

Another object of this invention is to provide an improved multi-port optical coupling device.

SUMMARY OF THE INVENTION

In accordance with the invention there is provided, an optical coupling system comprising a first collimator assembly having a first optical axis, a second collimator assembly having a second optical axis, an optical device disposed along an optical path between the first and the second collimator assembly, a first sleeve for containing the first collimator assembly, said first sleeve having an angled end face for forming a first angle; and a second sleeve for containing the second collimator assembly, said second sleeve having an end face for abutting the angled end face of the first sleeve such that the first optical axis of the first collimator assembly intersects with the second optical axis of the second collimator assembly at a coupling angle.

In accordance with an embodiment of the invention, the first sleeve and the second sleeve are relatively rotatable to each other for changing the coupling angle for coupling an optical signal between the first and the second collimator assembly.

Furthermore, in accordance with yet another embodiment, the end face of the second sleeve is angled for forming a second angle.

The coupling angle between the first optical axis and the second optical axis is smaller or substantially equal to a sum of the first angle and the second angle.

The optical device comprises at least one of a tap coupler, an isolator and a WDM filter.

In accordance with an embodiment of the present invention, the first collimator assembly comprises a first collimating lens supported in a first lens sleeve and a first fiber tube containing at least one optical fiber supported in a first fiber tube sleeve and wherein the second collimator assembly comprises a second collimating lens supported in a second lens sleeve and a second fiber tube containing at least one optical fiber supported in a second fiber tube sleeve. If desired, the collimating lens is a GRIN lens.

In accordance with the invention, there is further provided, an optical coupler device comprising a first collimator having a first optical axis, said first collimator comprising an input optical fiber tube having at least two optical fibers therein and an input lens, a second collimator having a second optical axis, said second collimator comprising an output optical fiber tube having at least two optical fibers therein and an output lens, said first collimator and said second collimator are optically aligned with each other, an optical device disposed along an optical path between the first collimator and the second collimator, a first outer sleeve for containing the first collimator, said first sleeve having an angled end face for forming a first angle, and a second outer sleeve for containing the second collimator, said second sleeve having an angled end face for abutting to the angled end face of the first sleeve such that the first optical axis intersects with the second optical axis at a coupling angle.

In accordance with an embodiment of the invention, the first outer sleeve and the second outer sleeve are relatively rotatable to each other for changing the coupling angle for coupling an optical signal between the first and the second collimator.

The coupling angle between the first optical axis and the second optical axis ranges from a difference to a sum of the first angle and the second angle.

In accordance with an embodiment of the invention, the tap coupler is disposed at an end face of the input lens for reflecting at least a portion of an optical signal propagating through said optical coupler device.

In yet a further embodiment of the present invention, the optical coupler device further comprises a filter retaining sleeve for retaining the WDM filter, wherein the filter retaining sleeve retains at least a portion of the output lens.

In yet another embodiment of the present invention, the isolator comprises a magnet and two isolator cores disposed at an end face of the input lens, wherein said magnet retains at least a portion of the input lens.

In accordance with another embodiment of the invention, an outer diameter of the input or output sleeve is larger than an outer diameter of the input or output fiber tube sleeve.

In accordance with another aspect of the invention, there is provided, a method of making an optical coupler device comprising the steps of making a first collimator subassembly, making a second collimator subassembly, sliding a first outer sleeve having an angled end face over the first collimator subassembly, sliding a second outer sleeve having an angled end face over the second collimator subassembly, abutting the angled end faces of the first and second outer sleeves, aligning the first and the second collimator subassemblies for providing an optical path between the first and the second collimator subassembly so that an image of an input fiber is coincident with a core of an output fiber, relatively translating the first and the second outer sleeves for accommodating an off-set of the optical path, relatively rotating the first and the second outer sleeve without rotating the first and second collimator subassemblies, for imparting a tilt for aligning the optical path; and fastening the first and the second outer sleeve to the first and second collimator subassembly and to each other.

In accordance with an embodiment of the invention, the method further comprises the step of fastening at last one of a tap coupler, an isolator, and a WDM filter between the first and the second collimator subassembly.

Advantageously, the present invention provides an optical coupling device and a method of making such an optical coupling device wherein rotatable wedges, such as the outer sleeves having an angled end face, are used to compensate for an angle between two collimator subassemblies.

BRIEF DESCRIPTION OF THE DRAWINGS

Exemplary embodiments of the invention will now be described in conjunction with the following drawings wherein like numerals represent like elements, and wherein.

DETAILED DESCRIPTION OF THE PREFERRED EMBODIMENTS

The present invention provides a method and an apparatus for an optical coupling device. In particular, an optical coupling device and a method of making such an optical coupling device with more than three ports is described.

Furthermore, the present invention includes a passive four-port hybrid device, called an Isolator-Tap-Multiplexer, and a technique for its fabrication. The fabrication technique can be extended to apply to multiple hybrid device designs of similar complexity. Due to the mechanical simplicity of the hybrid design proposed, it is expected that the reliability of devices made using this technique can approach that of single function devices.

Figure 1:
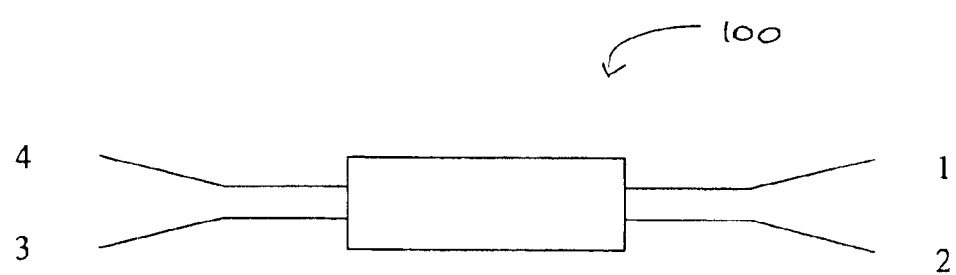
FIG. 1 shows a schematic functional diagram of an Isolator-Tap-Multiplexer optical coupling device.

Turning now to FIG. 1 a schematic functional diagram of an Isolator-Tap-Multiplexer optical coupling device 100 is shown. For example, the isolator is realized between Ports 1 and 3, while Ports 1 and 2 are connected as an optical tap, with a small amount of the optical signal diverted from Port 1 into Port 2. Ports 4 and 3 are connected as a pump multiplexer path, wherein a laser pump signal is combined with the output signal path of port 3.

| Path | Connection |
|---|---|
| Port 1 - Port 2 | Optical Tap |
| Port 1 -> Port 3 | Low loss connection (c-band) |
| Port 3 -> Port 1 | High loss (isolator) |
| Port 4 - Port 3 | Low loss connection (pump wavelength) |
| Port 1 - Port 4 | No Connection |

The tap and the multiplexer branch subassemblies are first fabricated separately. The isolator cores are then attached to one of these branches, and the two subassemblies are then optically aligned. They are then affixed in inner glass sleeves.

In optical fiber communication, optical signals are transmitted through optical fibers. To monitor the signal level or the conditions of the transmission, it is often necessary to tap a small amount of light from the main line. The conventional scheme for tapping is achieved by inserting an optical coating film in the main optical path. The coating film will reflect a small amount of the light being transmitted in the forward direction in the main path, while leaving most of the light transmitted in the main path for communication purposes. This small amount of light that is reflected by the optical coating film is then collected and analyzed in order to monitor the signal level or the conditions of transmission of the optical communication line.

In accordance with the present invention, two outer sleeves having an angled end face are fabricated. The outer sleeves are slid over the subassemblies and the subassemblies are aligned within the outer sleeves. In general, if the two angled end faces are abutting, the axes of the outer sleeves will make an angle with each other ranging from the difference between the end face angles to their sum.

Figure 2:
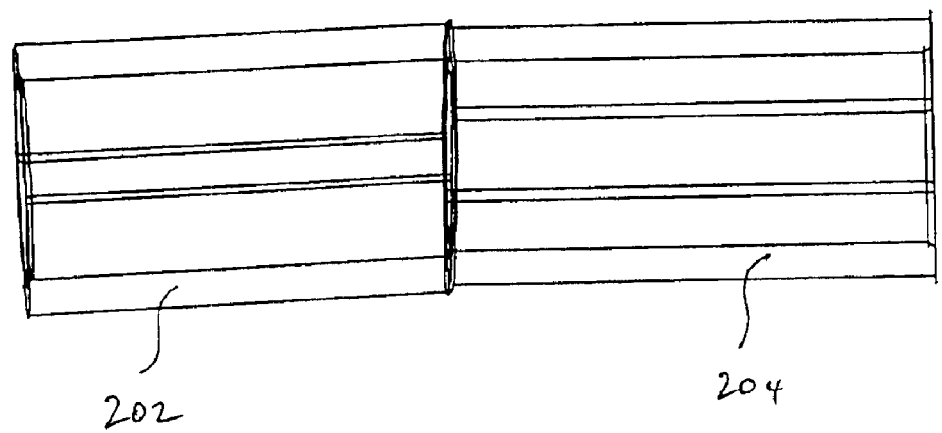
FIG. 2a is a schematic view of two outer sleeves having complementary slanted end faces oriented such that the optical axes of the sleeves and components therein are coincident forming 180 degree angle therebetween.
FIG. 2b is a schematic view of the same sleeves shown in FIG. 2a, wherein the sleeves are relatively rotated such that their optical axes intersect at an angle of 178 degrees; it is noted that a bend is defined where the two sleeves join.
Figure 2A:
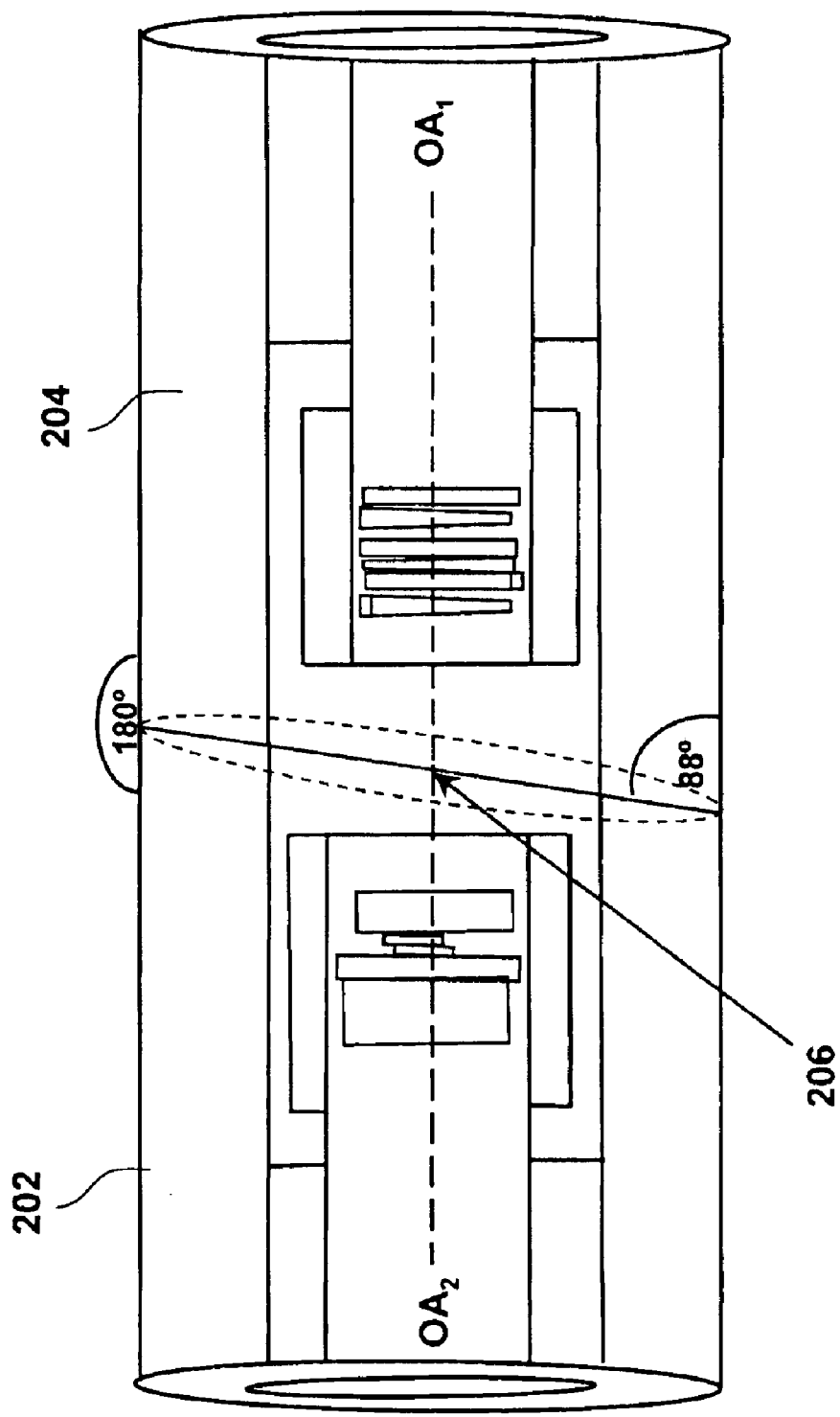
Figure 2B:
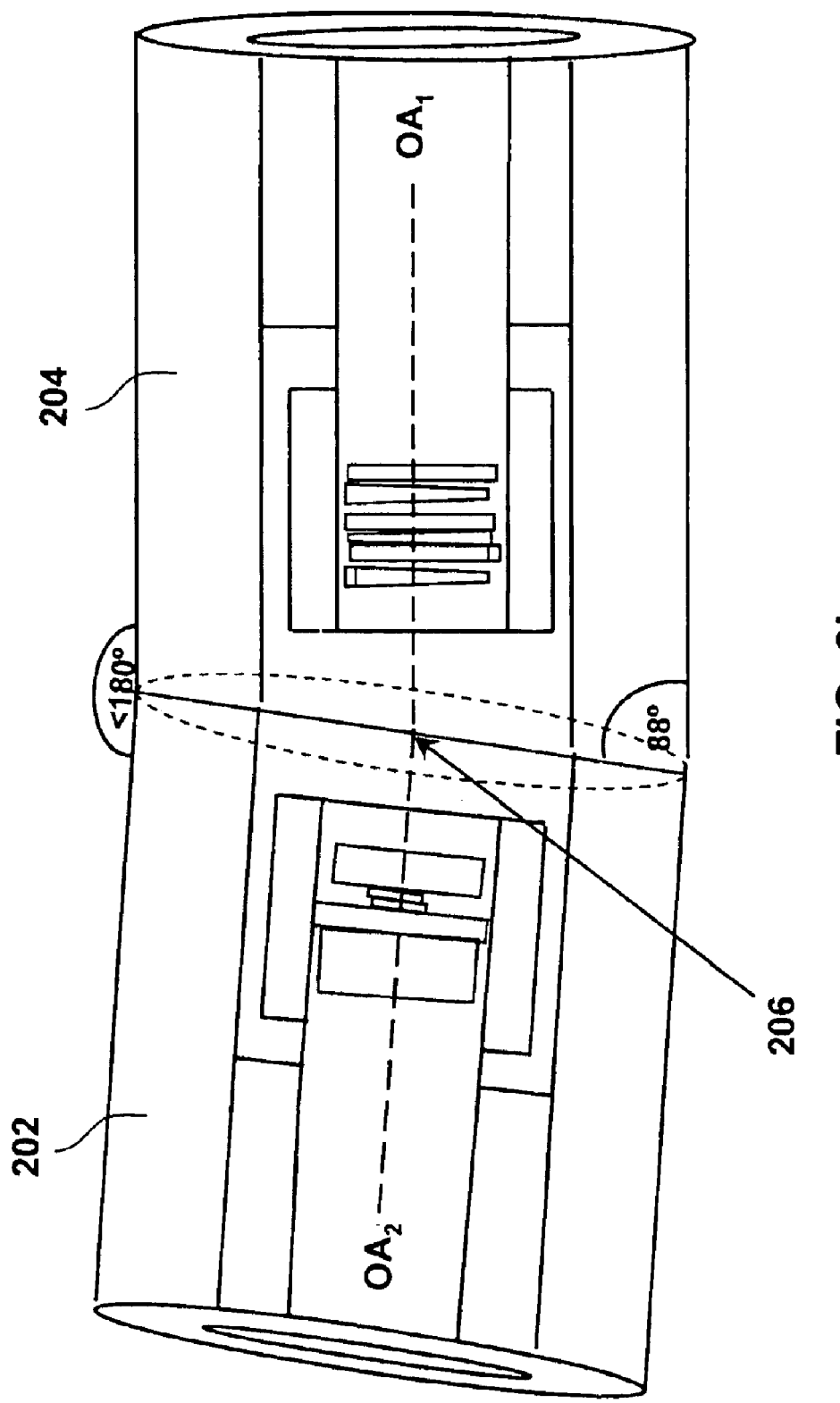

FIG. 2a shows a schematic view of two outer sleeves 202,204 in accordance with an embodiment of the present invention. In this embodiment the two outer sleeves have complementary angled end faces so that when they are mated at these angled end faces, as shown at 206, the axes of the tubes can make an angle of up to the sum of the end face angles. Thus, in this embodiment where the sleeves are oriented as shown, the optical axes of the two sleeves are coincident, or 180 degrees with respect to each other. In FIG. 2b, the same sleeves are relatively rotated so such that their optical axes $OA_1$ and $OA_2$ intersect at an angle of less than 180 degrees thereby forming a bend between the two sleeves, wherein their optical axes intersect. This provides a simple mechanism for varying the angle of the optical axes between respective lenses housed by the two outer sleeves. The components shown in FIGS. 2a and 2b will be described in more detail in FIG. 3. For simplicity, input and output optical fibers are not shown in FIGS. 2a and 2b.

Figure 3:
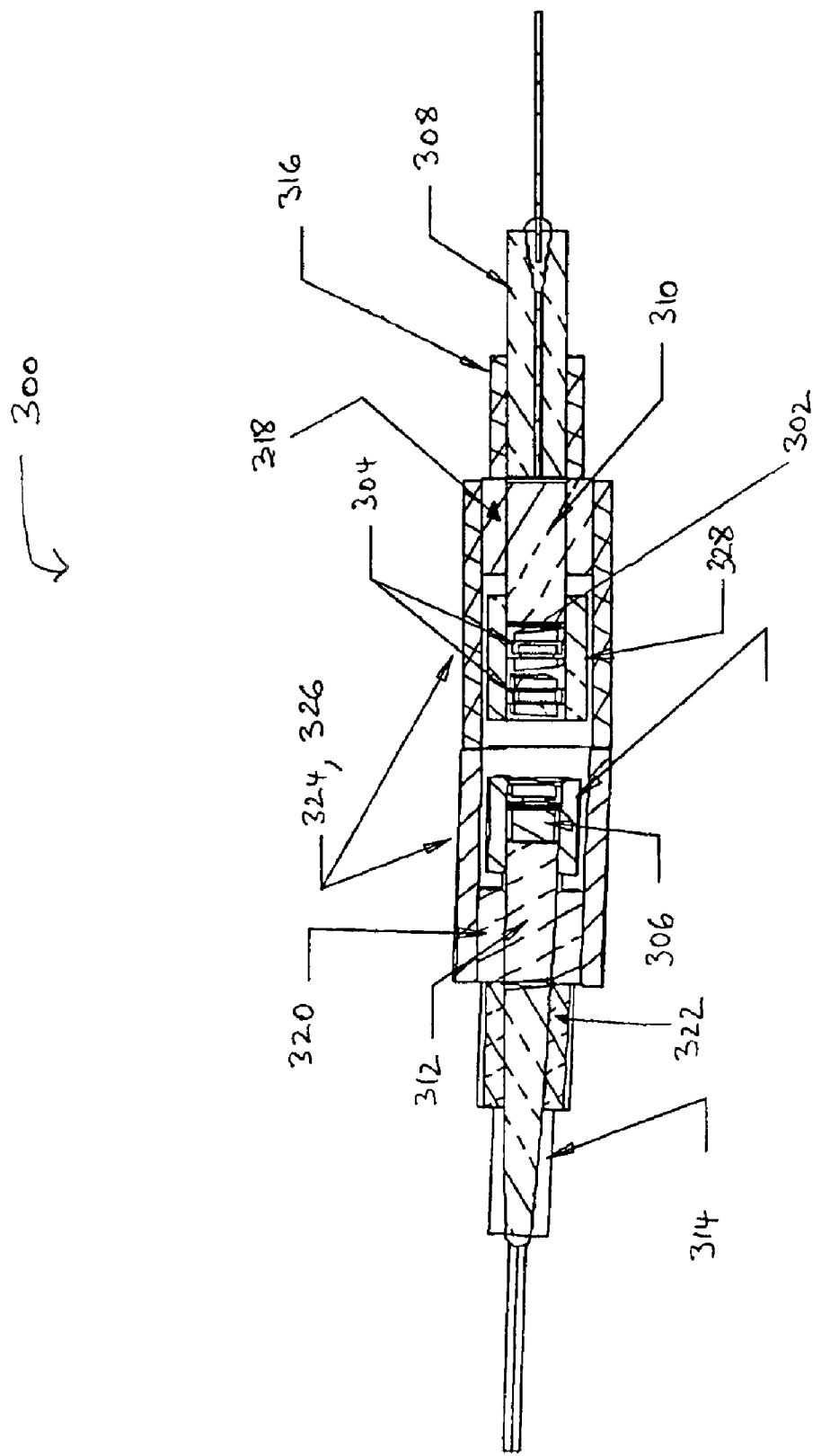
FIG. 3 shows a cross-sectional view of a 4-port hybrid coupling device.

FIG. 3 shows an optical coupling device in accordance with an embodiment of the present invention presenting a cross-sectional view of a 4-port hybrid coupling device 300. Optical coupling system 300 comprises a tap coupler 302, a dual stage isolator 304, and a WDM pump/signal combiner 306. Light is incident on the device from one of the two fibers contained in the input fiber tube 308. The incoming light is collimated by input GRIN lens 310, and is partially reflected at the left surface of this lens by tap coupler 302. The reflection is coupled into the other fiber held in the input fiber tube 308. This produces the tap coupler function of the device.

The remainder of the light that has not been reflected by this surface is then transmitted through the dual isolator core 304, and is transmitted through WDM filter 306. This light is then focused by output lens 312 onto one of the fibers in the output fiber tube 314. This constitutes the isolator function of the device.

Pump laser light entering the device on the other fiber in the output fiber tube 314 is collimated by output lens 312, reflected by WDM filter 306, and is then focused onto the output fiber, realizing the WDM pump multiplexer.

This device is fabricated by first assembling an input collimator by assembling the input fiber tube 308 and the input lens 310 using a standard glass sleeve technique. The input lens 310 and the input fiber tube 308 are each inserted into a glass sleeve, i.e. an input lens sleeve 318 and an input fiber tube sleeve 316, and are aligned by translating them with respect to each other until the light from the reflection at the far surface of the lens 310 is coupled from one fiber to the other. The sleeves 318 and 316 are then bonded to the lens 310 and fiber tube 308 and then to each other using hot-wicked epoxy or another bonding technique.

Analogously, the output collimator is fabricated by first assembling the output fiber tube 314 and the output lens 312 using the standard glass sleeve technique. The output lens 312 and the output fiber tube 314 are each inserted into a glass sleeve, i.e. an output lens sleeve 320 and an output fiber tube sleeve 322, and are aligned by translating them with respect to each other. The sleeves 320 and 322 are then bonded to the lens 312 and fiber tube 314 and then to each other using hot-wicked epoxy or another bonding technique.

In accordance with an embodiment of the invention, the input and output lenses are GRIN lenses. Alternatively, other collimating lenses can be used.

In accordance with a preferred embodiment of the present invention, the outer diameter of the lens sleeves 318, 320 are larger than the outer diameter of the fiber tube sleeves 316, 322 so that outer sleeves 324, 326 can slide freely on the respective lens sleeves 320, 318.

The isolator core assembly 304, consisting of a magnet 328 and two isolator cores 304, is then bonded to the lens 310 to complete the first subassembly.

Then, the WDM filter 306 is mounted onto the output lens 312. This is shown to be done using a mechanical spring mounting since this presents a robust technique with respect to damp heat testing. The invention is not intended to be limited to this mounting technique and other ways of mounting the WDM filter 306 to lens 312 are intended to be included. The output fiber tube 322 is then mounted in the same way as the input fiber tube, coupling light reflected by the filter from one fiber to the other. This yields two subassemblies, each with a reflective path coupled between its two fibers.

An outer sleeve 324, 326 having a angled end face is then slid over the lens sleeves 320, 318 in each subassembly.

Then, the two subassemblies are aligned with respect to each other so as to couple light from one fiber in the input fiber tube 308 into one of the fibers in the output fiber tube 314. This is accomplished by tilting one of the subassemblies with respect to the other, and then translating it laterally to maximize the transmission.

The two outer sleeves 324, 326 are then slid toward each other until they make contact, and then rotated until the two angled end faces mate with each other with the two angled surfaces flush with each other, as shown in FIG. 2. The outer sleeves 324, 326 are then bonded to their respective lens sleeves 320, 318 and are then bonded to each other at the central butt joint. The use of rotatable wedged tubes, such as the two outer sleeves 324, 326, as shown in FIGS. 2–3 is used to compensate for the inevitable angle between the two collimator assemblies.

The distance between the collimating lenses is not critical because the light beam propagating between the two collimator subassemblies is collimated.

In order to achieve an optimum alignment, a minimum of 10 degrees of freedom are required including 3 degrees of freedom for an x, y, and z translation for each of the input and output fiber tubes, resulting in a total of 6 degrees of freedom. The remaining four degrees of freedom result from tilting (2 degrees) and translating (up-down) (2 degrees).

In accordance with a further embodiment of the present invention, only one of the outer sleeves has an angled end face. In this case, the outer sleeve and the collimator subassembly within that outer sleeve is rotated to achieve the necessary two degrees of freedom for aligning the optical coupling system.

The rotation of the outer sleeves is performed to obtain two substantially parallel planar surfaces, i.e. the end faces of the outer sleeves are substantially parallel when the alignment of the optical coupling system is optimized.

The optical coupling system and the method of making an optical coupling system in accordance with the present invention is capable of aligning and fixing two parts in angle and translation, unlike a pure translation currently employed in prior art assemblies. Advantageously, only zero thickness bonds are required, unlike a space-filling solder technique, for example.

In accordance with an embodiment of the present invention, the outer sleeves 324, 326 are made of glass. Alternatively, the outer sleeves can be made of metal if the apparatus and method of the invention are adapted to devices fabricated with laser welding or any other technique that is incapable of space-filling.

The above described embodiments of the invention are intended to be examples of the present invention and numerous modifications, variations, and adaptations may be made to the particular embodiments of the invention without departing from the spirit and scope of the invention, which is defined in the claims.

What is claimed is:

1. An optical coupling system comprising:
    a first collimator assembly having a first optical axis;
    a second collimator assembly having a second optical axis;
    an optical device disposed along an optical path between the first and second collimator assembly;

a first outer sleeve for containing the first collimator assembly, said first outer sleeve having an angled flat end face for forming a first angle so that the end is slanted; and a second outer sleeve for containing the second collimator assembly, said second outer sleeve having a flat end face for abutting the angled flat end face for abutting the angled flat end face of the first outer sleeve such that the first optical axis of the first collimator assembly intersects with the second optical axis of the second collimator assembly at a coupling angle about the intersection of the optical axis of the first collimator and the optical axis of the second collimator, wherein the coupling angle is a function of the angled flat end face forming a first angle with the flat end face of the second outer sleeve, wherein the first outer sleeve and the second outer sleeve are relatively rotatable to each other for changing the coupling angle for coupling an optical signal therebetween the first and the second collimator prior to being permanently fixed together.

2. An optical coupling system comprising:

a first collimator assembly having a first optical axis;

a second collimator assembly having a second optical axis;

an optical device disposed along an optical path between the first and the second collimator assembly;

a first sleeve for containing the first collimator assembly, said first sleeve having an angled flat end face for forming a first angle so that the end is slanted; and a second sleeve for containing the second collimator assembly, said second sleeve having a flat end face for abutting the angled flat end face of the first sleeve such that the first optical axis of the first collimator assembly intersects with the second optical axis of the second collimator assembly at a coupling angle about the intersection of the optical axis of the first collimator and the optical axis of the second collimator, wherein the coupling angle is a function of the angled flat end face forming a first angle with the flat end face of the second sleeve, wherein the first sleeve and the second sleeve are relatively rotatable to each other for changing the coupling angle for coupling an optical signal between the first and the second collimator assembly, and wherein when the sleeves are relatively rotated about their optical axes, the coupling angle between the sleeves changes.

3. The optical coupling system as defined in claim 2 wherein the end face of the second sleeve is angled for forming a second angle.

4. The optical coupling system as defined in claim 3 wherein the coupling angle between the first optical axis and the second optical axis is smaller or substantially equal to a sum of the first angle and the second angle.

5. The optical coupling system as defined in claim 4 wherein the optical device comprised at least one of a tap coupler, an isolator and a WDM filter.

6. The optical coupling system as defined in claim 5 wherein the first collimator assembly comprises first collimating lens supported in a first lens sleeve and a first fiber tube containing at least one optical fiber supported in a first fiber tube sleeve and wherein the second collimator assembly comprises a second collimator lens supported in a second lens sleeve and a second fiber tube containing at least one optical fiber supported in a second fiber tube sleeve.

7. The optical coupling system as defined in claim 6 wherein the collimating lens is a GRIN lens.

8. An optical coupler device comprising:

a first collimator having a first optical axis, said first collimator comprising an input optical fiber tube having at least two optical fibers therein and an input lens;

a second collimator having a second optical axis, said second collimator comprising an output optical fiber tube having at least two optical fibers therein and an output lens, said first collimator and said second collimator are optically aligned with each other;

an optical device disposed along an optical path between the first collimator and the second collimator;

a first outer sleeve for containing the first collimator, said first sleeve having an angled end face for forming a first angle; and a second outer sleeve for containing the second collimator, said second sleeve having an angled end face abutting to the angled end face of the first sleeve such that the first optical axis intersects with the second optical axis at a coupling angle greater than zero degrees, wherein the first outer sleeve and the second outer sleeve are relatively rotatable to each other for changing the coupling angle for coupling an optical signal between the first and the second collimator.

9. The optical coupler device as defined in claim 8 wherein the coupling angle between the first optical axis and the second optical axis ranges from a difference to a sum of the first angle and the second angle.

10. The optical coupler device as defined in claim 9 wherein the optical device comprises at least one of a tap coupler, an isolator, and a WDM filter.

11. The optical coupler device as defined in claim 10 further comprising an input fiber tube sleeve for retaining the input fiber tube, an input lens sleeve for retaining the input lens, an output fiber tube sleeve for retaining the output fiber tube, and an output lens sleeve for retaining the output lens.

12. The optical coupler device as defined in claim 11 wherein the tap coupler is disposed at an end face of the input lens for reflecting at least a portion of an optical signal propagating through said optical coupler device.

13. The optical coupler device as defined in claim 12 further comprising a filter retaining sleeve for retaining the WDM filter, said filter retaining sleeve further retaining at least a portion of the output lens.

14. The optical coupler device as defined in claim 12 wherein the isolator comprises a magnet and two isolator cores disposed at an end face of the input lens, said magnet retains at least a portion of the input lens.

15. The optical coupler device as defined in claim 11 wherein an outer diameter of the input or output sleeve is larger than an outer diameter of the input or output fiber tube sleeve.

16. The optical coupler device as defined in claim 8 wherein the input and the output lens is a collimating lens.

17. The optical coupler device as defined in claim 16 wherein the collimating lens is GRIN lens.

18. A method of making an optical coupler device comprising the steps of:

making a first collimator subassembly;

making a second collimator subassembly;

sliding a first outer sleeve having an angled end face over the first collimator subassembly;

sliding a second outer sleeve having an angled end face over the second collimator subassembly;

abutting the angled end faces of the first and second outer sleeves;

aligning the first and the second collimator subassemblies for providing an optical path between the first and the second collimator subassembly so that an image of an input fiber is coincident with a core of an output fiber;

relatively translating the first and the second outer sleeves for accommodating an off-set of the optical path;

relatively rotating the first and the second outer sleeve without rotating the first and second collimator subassemblies, for imparting a tilt for aligning the optical path; and fastening the first and the second outer sleeve to the first and second collimator subassembly and to each other.

19. The method as defined in claim 18 further comprising the step of fastening at last one of a tap coupler, an isolator, and a WDM filter between the first and the second collimator subassembly.

20. An optical coupler device comprising:

a first collimator having a first optical axis, said first collimator comprising an input optical fiber tube having at least two optical fibers therein and an input lens;

a second collimator having a second optical axis, said second collimator comprising an output optical fiber tube having at least two optical fibers therein and an output lens, said first collimator and said second collimator are optically aligned with each other;

an optical device disposed along an optical path between the first collimator and the second collimator;

a first outer sleeve for containing the first collimator, said first sleeve having an angled end face for forming a first angle; and a second outer sleeve for containing the second collimator, said second sleeve having an angled end face abutting to the angled end face of the first sleeve such that the first optical axis intersects with the second optical axis at a coupling angle less than or greater than 180 degrees so as to provide an offset in the optical axes between the first and second collimator wherein the first outer sleeve and the second outer sleeve are relatively rotatable to each other for changing the coupling angle for coupling an optical signal between the first and the second collimator prior to being permanently fixed together.

* * * * *